Sept. 29, 1970     D. E. GRIMSHAW     3,530,990
SEWAGE TREATMENT SYSTEM
Filed May 8, 1969     4 Sheets-Sheet 1
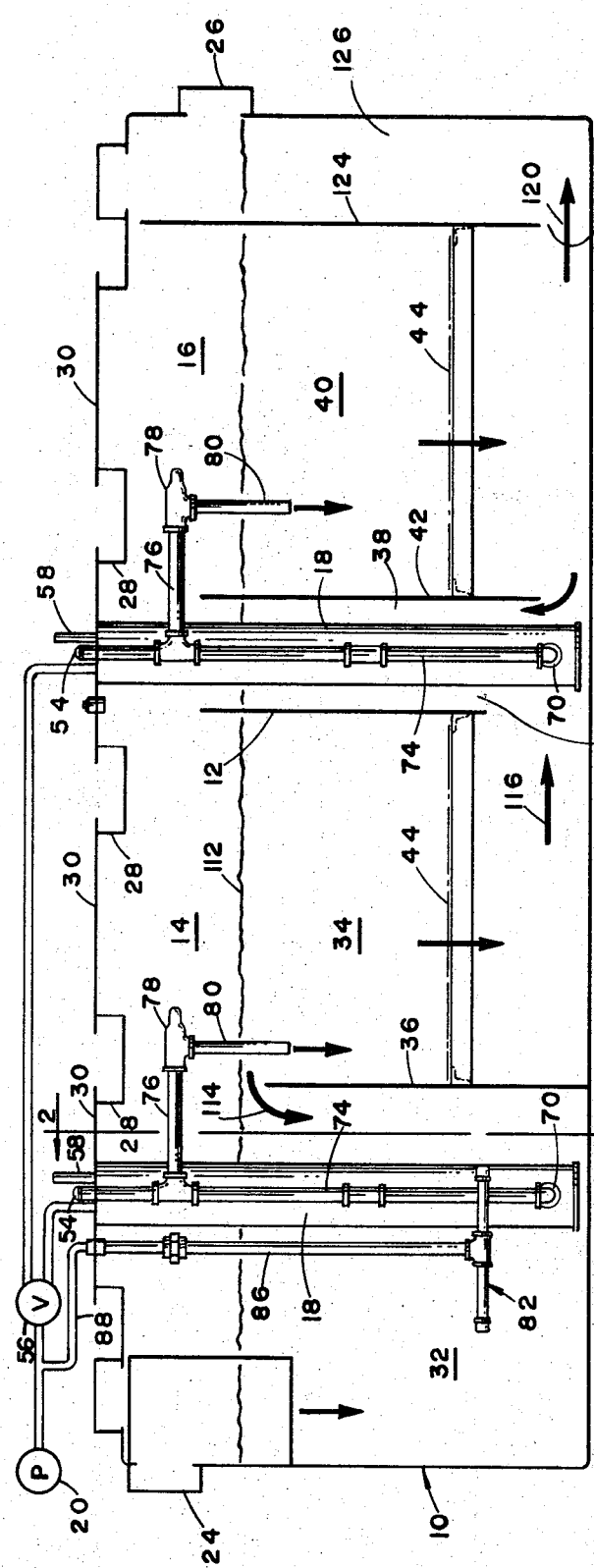
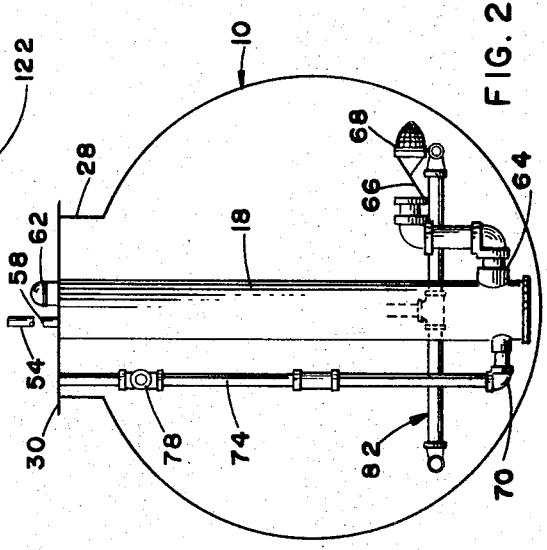
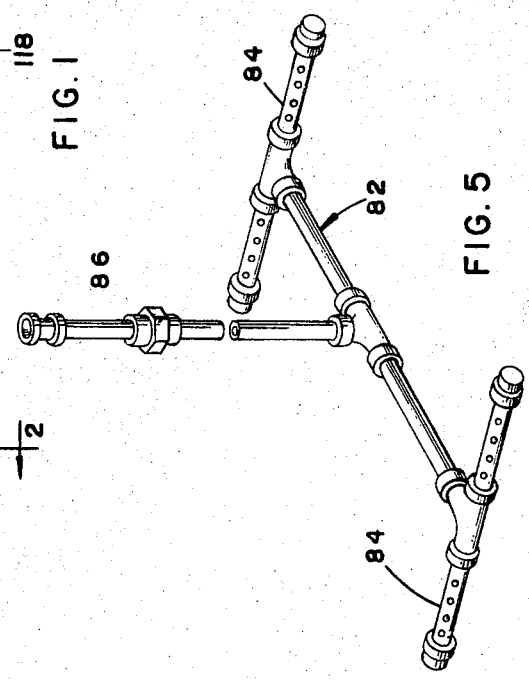
INVENTOR
DERALD E. GRIMSHAW
BY
ATTORNEY Sept. 29, 1970     D. E. GRIMSHAW     3,530,990

SEWAGE TREATMENT SYSTEM

Filed May 8, 1969     4 Sheets-Sheet 4

INVENTOR
DERALD E. GRIMSHAW

BY

ATTORNEY

United States Patent Office 3,530,990
Patented Sept. 29, 1970

3,530,990
SEWAGE TREATMENT SYSTEM
Derald E. Grimshaw, Denver, Colo., assignor to
Environmental Services, Inc., York, Pa.
Filed May 8, 1969, Ser. No. 822,912
Int. Cl. C02c 1/12
U.S. Cl. 210—199                                  16 Claims

ABSTRACT OF THE DISCLOSURE

A sewage treatment system comprising a tank arrangement having one or more primary compartments, separated by baffles for restricted passage of liquid therebetween, each primary compartment having a sub-compartment therein provided with a sludge retaining screen, each primary compartment having a pneumatic circulator unit therein operable to receive a segregated quantity of influent to be treated, said unit having a sparger therein connected to a power operated air compressor and operable to super-saturate segregated quantities of influent with air and discharging such super-saturated quantities into the sub-compartment of each primary compartment for accelerated promotion of bacteria within the system and thereby expedite the treatment of sewage to reduce the B.O.D. thereof to an acceptable limit.

CROSS-REFERENCE TO RELATED APPLICATION

Co-pending application, Ser. No. 757,253, filed Sept. 4, 1968, now abandoned, discloses certain features of a pneumatic circulator employed in the treatment system of the present invention.

BACKGROUND OF THE INVENTION

Systems and arrangements for aerating sewage and thereby reduce the B.O.D. content thereof to acceptable levels have previously been developed and are in current use wherein air under pressure, from a suitable source, is discharged into tanks of various sizes, depending upon the quantity of liquid to be treated. Said tanks, in one way or another, are open to atmosphere, whereby the air discharged into the liquid therein bubbles freely therethrough and a high percentage thereof rises to the surface and escapes to atmosphere. Under such circumstances, volumes of air substantially in excess of the portions which actually aerate the liquid are required to effect adequate treatment of the liquid to develop an acceptable quantity of bacteria which acts upon the biodegradable material within waste water and sewage required to be treated under aerobic conditions. Further as a result of such conventional means for treating sewage, in order to reduce the B.O.D. content to a satisfactory level, the period of retention of the liquid within the treating apparatus is substantial and of the general range of approximately five days, within which the total B.O.D. of the liquid is reduced by about two-thirds, but according to present standards, the remaining percentage is acceptable for discharge to public water-ways or other receiving means.

Under such circumstances, either in regard to sewage treating plants for individual residences, or communities comprising a number of residences, retaining the influent for treatment within a tank for the required period requires relatively very large tanks in proportion to the volume of liquid being discharged thereinto to reduce the organic matter to acceptable levels by biological oxidation. In addition to requiring relatively large tank capacities under the circumstances referred to, means to produce relatively high quantities of air under pressure are required for aeration of the influent liquid while retained for treatment within said tank means.

SUMMARY OF THE INVENTION

It is a principal object of the present invention to minimize the size of tanks required to receive and retain influent sewage liquid to be treated by aeration and also minimize the capacity of air compressor equipment operable to discharge air into the liquid for such oxidation of organic manner.

It is another object of the invention to render the use of such minimum tank size and air compression capacity feasible by segregating successive quantities of the influent sewage liquid in appropriate enclosures and injecting air under pressure therein to super-saturate the liquid and successively discharge quantities of said super-saturated liquid into the primary body of liquid within said tank means of minimum size and thereby accelerate the growth of bacteria which results in a more rapid consumption of organic matter by bacteria than is possible with conventional means, whereby the retention time within the tank is reduced very substantially over that required in conventional equipment, thus permitting the use of a much smaller tank capacity than in conventional systems and, by continual cyclical injection of air into segregated quantities into the main body of each compartment, whereby is required.

It is a further object of the invention to intensify the acceleration of the reduction of the B.O.D. of waste sewage liquid by employing baffle means to divide the overall tank capacity into a plurality of primary compartments and employing a pneumatic circulator in each compartment of the type operable successively to segregate quantities of liquid and super-saturate the same with air, followed by successive discharge of the super-saturated quantities into the main body of such compartment, whereby the partially treated liquid from the first compartment is discharged into the second compartment where the liquid is further super-saturated by the pneumatic circulator therein prior to discharge from the system of liquid having the B.O.D. content reduced to an acceptable level and wherein such reduction is accomplished in minimum time.

Still another object of the invention is to divide each of the aforementioned primary compartments in the tank arrangement by additional baffles to form sub-compartments therein in which screens are supported preferably in the lower portions of the sub-compartments to receive and retain sludge which contains and nourishes bacteria upon the organic matter which is consumable and convertible by said bacteria, said screens and layers of sludge thereon retarding the flow of B.O.D. solids therethrough and thereby promoting maximum efficiency in the reduction of the B.O.D. content of the liquid in the various compartments and sub-compartments of the tank system.

A still further object of the invention is to provide additional, auxiliary aerated means within the primary tank compartment to further augment the propagation of bacteria within the sewage liquid prior to quantities thereof being segregated within said pneumatic circulators in the various compartments of said tank system, and to break up solids.

BRIEF DESCRIPTION OF THE DRAWINGS

FIG. 1 is a side elevation of an exemplary tank arrangement provided with baffle means defining a plurality of primary and sub-compartments in which sewage liquid is progressively treated in accordance with the principles of the invention, said view containing directional flow arrows illustrating certain flow patterns of the liquid.

FIG. 2 is a vertical sectional elevation taken on the line 2—2 of FIG. 1.

FIG. 5 is a perspective view of an auxiliary air sparger, partly broken away to foreshorten a portion of the same, utilized in the primary compartment of the tank system illustrated in FIG. 1.

DESCRIPTION OF THE PREFERRED EMBODIMENTS

Figures 3, 4:
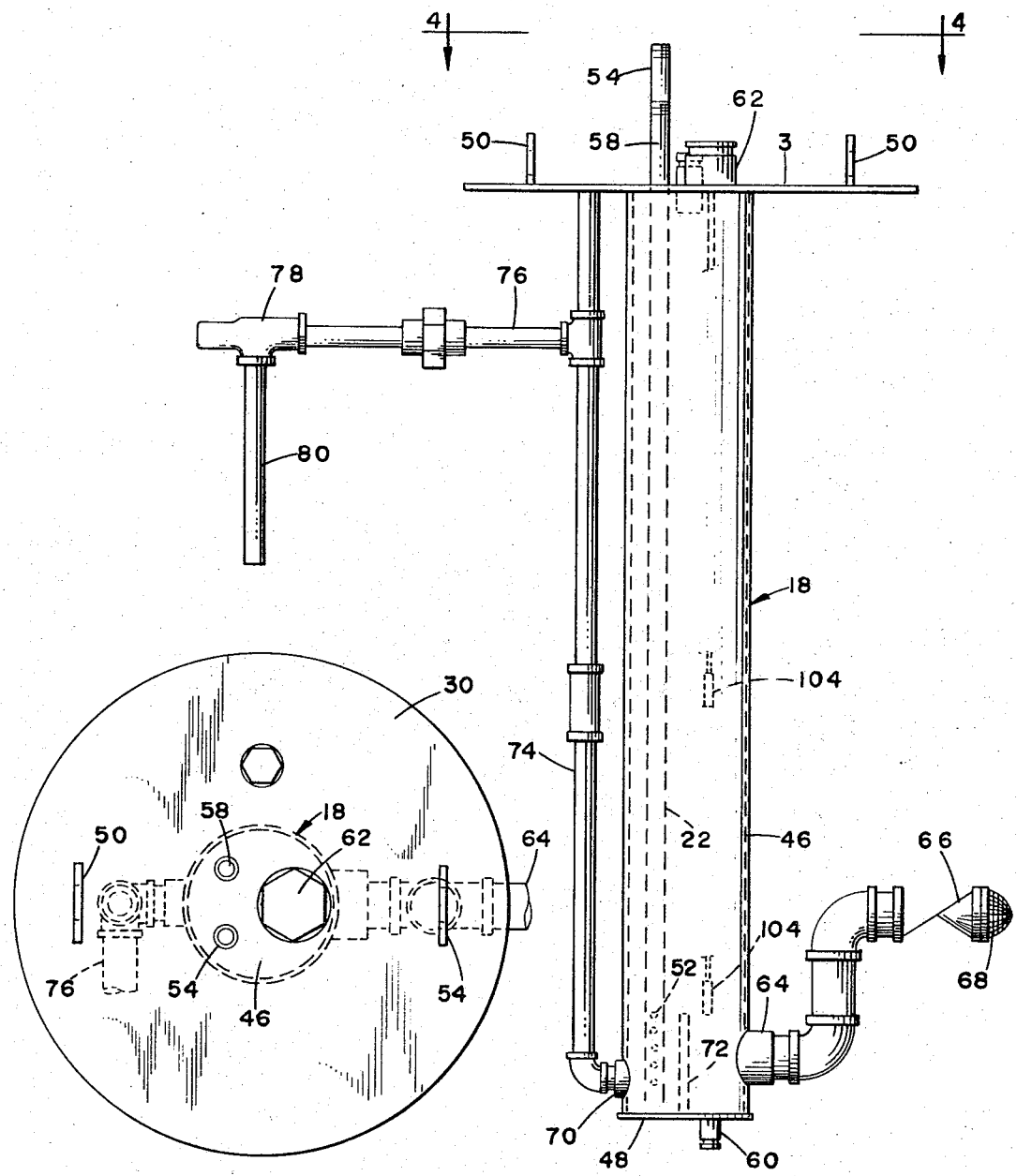
FIG. 3 is an enlarged sectional view of an exemplary pneumatic circulator unit of the type illustrated in each tank compartment of the system shown in FIG. 1.
FIG. 4 is a top plan view of the pneumatic circulator unit shown in FIG. 3 as seen on the line 4—4 thereof.

Referring particularly to FIGS. 1 through 4 of the drawings, which represent an exemplary illustration of one embodiment of sewage treatment system, it is to be understood that the general principle, dimensions, arrangements, and specific illustrations of elements are to be considered as illustrative rather than restrictive. FIG. 1 in particular, however, is highly suitable to illustrate several of the salient, primary principles of the present invention such as a tank 10 containing a baffle 12 which divides the tank into a first compartment 14 and a second compartment 16. Each of said compartments have a pneumatic circulator 18 therein to which air under moderate pressure, produced by a relatively low capacity pump 20 preferably to cyclically, but simultaneously, if desired, deliver said air to spargers 22, see FIG. 3. This is for the dual purpose of super-saturating segregated quantities of influent liquid within the closed containers of circulators 18 and also effecting discharge of super-saturated liquid therefrom by means of air pressure and in the absence of auxiliary pumps or other mechanical means to accomplish the same. In view of this, the only actual power means in the entire system which requires the supply of driving energy thereto is the pump 20.

The particular system specifically shown in FIG. 1 has been selected for illustration of the principles of the present invention and the scale has been so chosen, solely for illustrative purposes, that the system is adapted to handle a daily input of 600 gallons of household waste, retained for a period of 48 hours, a maximum of 0.20 lb. of B.O.D. generated per person per day, more than 4000 cubic feet of air supplied per pound of B.O.D., and a total tank holding capacity of approximately 1200 gallons.

The tank 10 is intended to be mounted within the ground, the upper surfaces thereof being preferably below local frost line. One of the outstanding advantages of the system is that the pump or compressor 20 may be located above ground, in a suitable location such as a service room or the like, and appropriate conduits of suitable size carry the compressed air to the various elements of the system requiring the same, including the pneumatic circulators 18. Therefore, it will be seen that the system requires a minimum of mechanical devices and consequently requires minimum power consumption. The super-saturation of the liquid accelerated the growth of bacteria and, consequently, the reduction of the B.O.D. of the influent, whereby minimum retention time within the tank is required, which results in minimum tank sizes.

By way of contrast with conventional systems which do not employ the principles of the present invention, comparable reduction of B.O.D. by such conventional aerating equipment would require a tank capacity of approximately five times the size of the tank required by the present invention, and the retention time within the entire unit would be approximately five times the time required by the present invention.

Referring further to FIGS. 1–4, the tank 10 is provided with an inlet 24 which is connected to a sewage disposal line leading from either a single residence or a line from a group of residences, depending upon the capacity of the tank and system included therein, according to desired design. The opposite end of tank 10 has discharge means 26. The tank may be made from any suitable material such as sheet metal suitably protected against rust and corrosion by a coating of adequate thickness of appropriate material. If desired however, the tank may be formed from reinforced concrete or otherwise. Further, the shape of the tank may be either rectangular, circular, cylindrical, or otherwise. Also, the upper wall portion of the tank is provided with a plurality of manways 28, covered by appropriate covers 30, certain of the covers 30 supporting the pneumatic circulators 18 in depending manner.

Although the tank 10 has been illustrated as comprising first compartment 14 and second compartment 16, which are separated by the baffle 12, it is to be understood that only a single main compartment may be used, or conversely, a greater number of compartments may be provided, depending upon the requirements of the system to treat the rate of feed to the same. In each of the principal compartments however, it is preferred that the same be divided into a primary compartment 32 and a secondary or subcompartment 34. Such primary and secondary or sub-compartments are separated by a dividing baffle 36 which extends to the bottom of the tank 10. As illustrated, with respect to second compartment 16, the primary compartment 38 is substantially smaller than the secondary or sub-compartment 40, the two being separated by dividing baffle 42 which has a passage space beneath the lower edge thereof of predetermined size.

Each of the secondary or sub-compartments 34 and 40 have appropriate supporting means therein to receive and support a grid-type screen 44 which retains a layer of sludge comprising a mixture of bacteria and biodegradable organic material which the bacteria or microorganisms reduce to stable compounds such as $CO_2$ and water. It will be seen that these screens preferably are located in the lower portions of the sub-compartments 34 and 40, for purposes to be described hereinafter.

Referring to FIGS. 3 and 4, the exemplary sparger 18 therein comprises a cylindrical container 46 which, for example, is formed from suitable tubing or pipe of commercial type. An appropriate length thereof has a bottom 48 fixed thereto and the upper end thereof is suitably fixed to one of the covers 30 for the manways 28. Said cover may be provided with appropriate apertured ears 50 to enable the handling thereof either by manual or power means, depending upon the size and corresponding weight of the pneumatic circulator 18 supported thereon. In operation, the pneumatic circulators are preferably mounted vertically. Supported within each of the containers 46 of said circulators is a sparger 22 which is provided with an appropriate arrangement of air discharge perforations 52, see FIG. 3. The upper end 54 of the sparger is arranged to be connected with an air conduit, leading, for example, from valve 56, shown in FIGS. 1 and 12, which preferably is a 2-way, solenoid actuated valve. The upper end of the pneumatic circulator 18 also is provided with a vent 58 which communicates suitably with the atmosphere by means to be described hereinafter. A clean out plug 60 is provided in the bottom 48 of container 46 and an electrode coupling 62 is formed in cover 30 in alignment with the interior of the container 46.

The cylindrical container 46 for each of the pneumatic circulators 18, as seen in FIG. 3, is provided with an inlet 64 having a check valve 66 on the outer end thereof and preferably including a strainer 68. It will be seen that the inlet 64 is adjacent the lower end of container 46. Similarly, a discharge coupling 70 also is adjacent the bottom of container 46, diametrically opposite the inlet 64. The container also has a dividing baffle 72 extending upwardly from the bottom 48 so as to improve oxygen saturation of liquid by being in closer proximity to the sparger 22. A discharge pipe 74 extends upward from coupling 70 and near the upper end thereof has a lateral conduit leading to a pressure-sensitive relief valve 78 which discharges vertically downward through conduit 80. From FIG. 1, it will be seen that the discharge conduit 80 of the several pneumatic circulators 18 respectively extend over the baffles 36 and 42, into the sub-compartments 34 and 40 of the first and second compartments 14 and 16.

Also disposed within the first compartment 14 and particularly the primary compartment 32 thereof, is a supplemental or auxiliary aeration head 82 which, as can be seen best from FIG. 5, has a plurality of branches 84 which are perforated for the discharge of air under pressure therefrom. The head 82 is on the lower end of a feed pipe 86, the upper end of which is supported by the cover 30 by which the adjacent pneumatic circulator 18 in the sub-compartment 32 is supported. As seen from FIG. 1, a branch air feeding conduit 88 leads from the supply line from the pump 20 to the upper end of feed pipe 86. If desired, a suitable restricting orifice may be placed within the line in order to regulate the amount of air under pressure delivered to the discharge head 82.

Figures 11, 12:
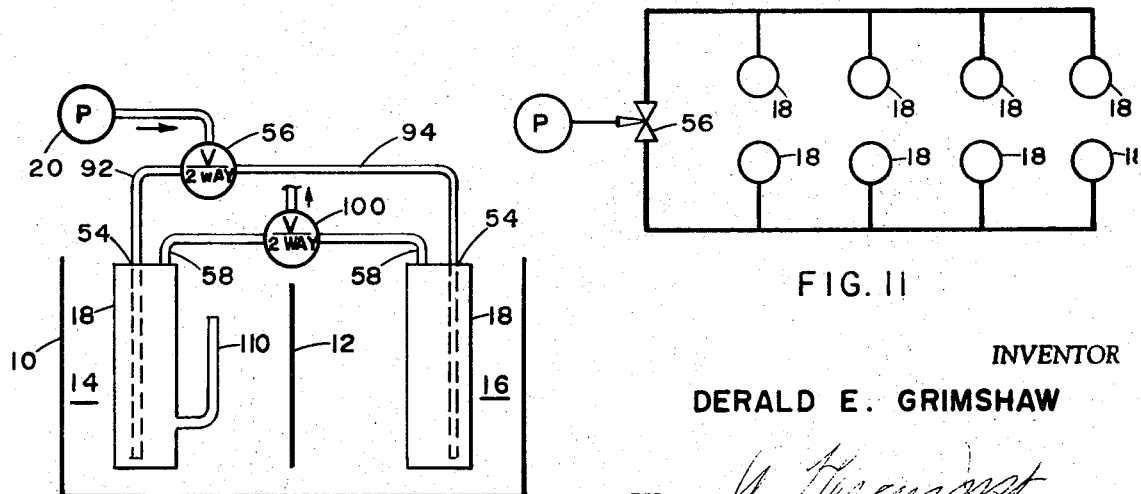
FIG. 11 is a diagrammatic illustration of an exemplary series, parallel arrangement of a plurality of treating units.
FIG. 12 is a diagrammatic illustration of a compressed air delivery system arranged for cyclical operation of the pneumatic circulator units respectively in the tank compartments shown in FIG. 1.

Referring to FIG. 12, wherein a diagrammatic illustration of the air supply conduits and lines is set forth, it will be seen that the pump 20 delivers air at a moderate pressure. For example, in accordance with exemplary statistical description set forth above relative to the system illustrated in FIG. 1, the pump 20 has a capacity of delivering 1.5 cubic feet of air per minute. As in regard to the foregoing statistics however, this is merely exemplarly rather than restrictive since the capacity of the pump is selected to provide the required amount of air, under suitable pressure above atmospheric, to permit satisfactory operation of the system in accordance with the principles of the invention. Such rate of discharge requires only very low power consumption for an individual residence, for example, at nominal cost, and the compressor may be operated continuously, preferably at variable controllable capacity and discharge pressures.

Especially if the pneumatic circulators 18 in the respective compartments are operated cyclically, the solenoid is operated by a level probe operable in pneumatic circulator 18 in compartment 32, described hereinafter, which shifts the 2-way valve successively to deliver air to conduit 92 or conduit 94, shown in FIG. 12, while the pump 20 operates continuously. These conduits respectively are connected to the two discharge ports of valve 56. Further, the vents 58 from the circulators 18 respectively are connected to the two inlets of another 2-way solenoid valve 100 which discharges to atmosphere and is in circuit with valve 56 as described hereinafter. The purpose of this equipment will now be described.

OPERATION OF THE SYSTEM

Referring to FIGS. 6–10, one pneumatic circulator 18 is illustrated therein as representative of all circulators in the entire system. Relative to FIG. 6, assume that the system is newly established and is being placed in operation. The sewage liquid is gradually introduced to one of the compartments such as first compartment 14 and particularly into primary compartment 32 thereof. The pressure-sensitive discharge valve is closed under such conditions. Solenoid valve 56 also is closed and vent valve 100 is open to the pump discharge for passage to atmosphere. The sewage flows through the check valve 66 comprising the inlet to the pneumatic circulator 18. Within the circulator 18 is a level probe 104 responsive to the liquid level within the container 46 of the pneumatic circulator 18.

Figure 6:
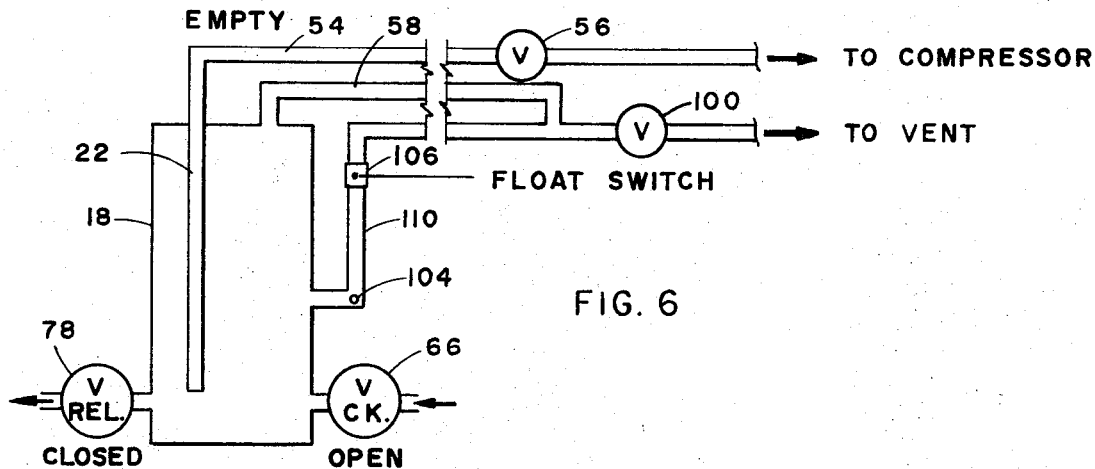
FIGS. 6–10 are diagrammatic views illustrating successive steps in the operation of the pneumatic circulator unit shown in detail in FIG. 3 and also illustrated in FIGS. 1 and 2.
Figure 7:
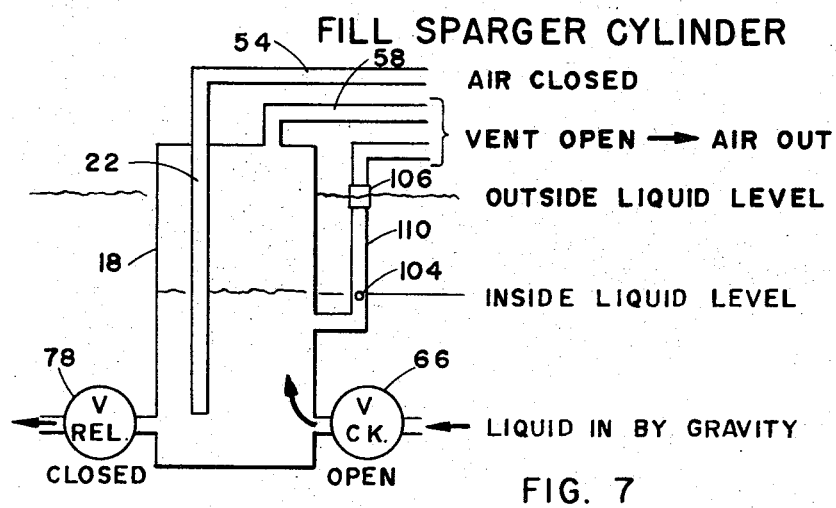
Figure 8:
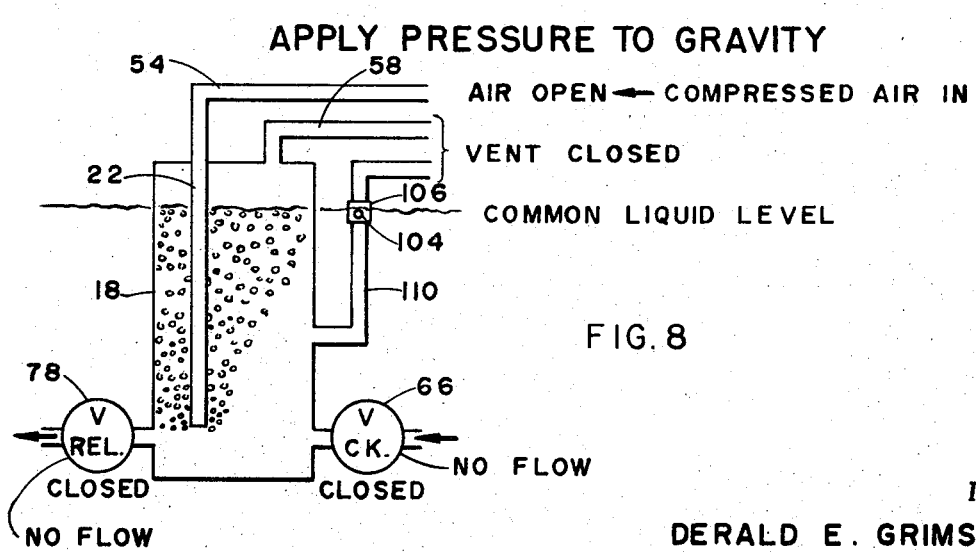
Figure 9:
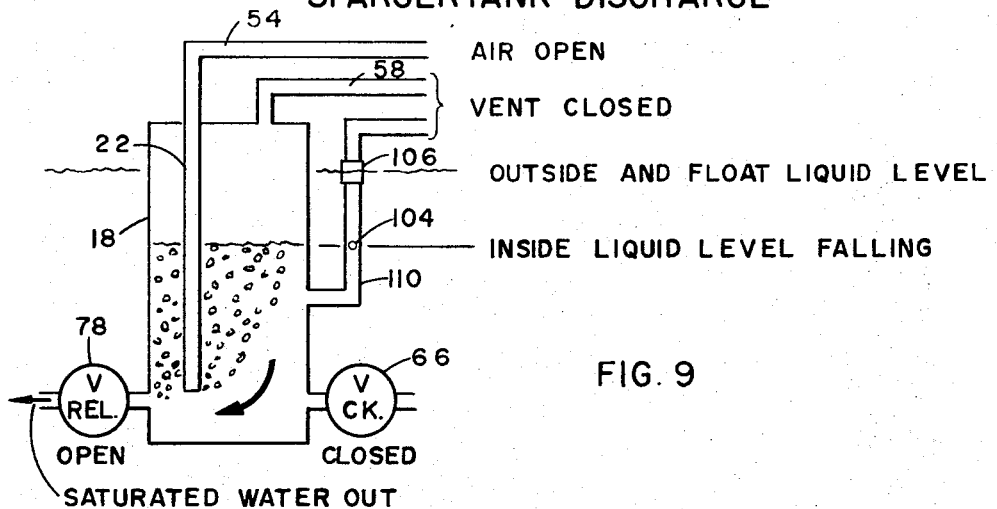
Figure 10:
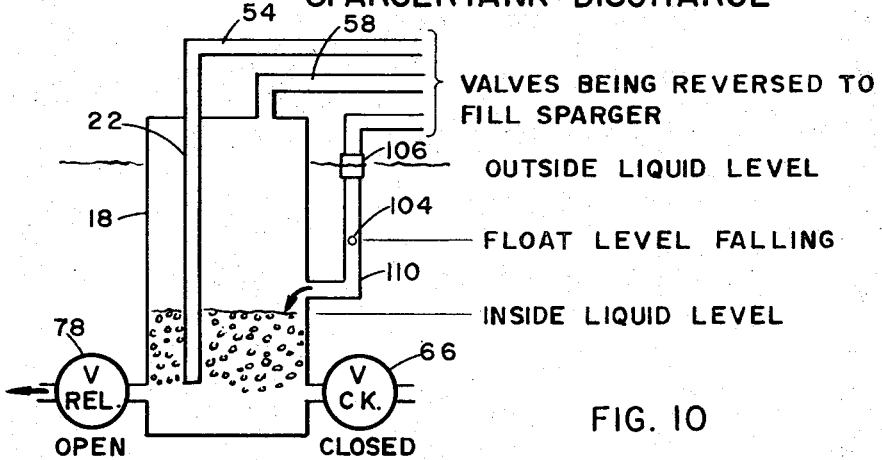

In FIG. 6, the probe 104 is at its lowest level and influent flows through the check valve 66 and rises within the circulator 18. This is exemplified at a certain stage of progression in FIG. 7, in which it will be seen that the outside liquid level within compartment 32 for example is higher than the level within the circulator 18. The probe 104 is commencing to rise in response to the rising level within the circulator 18. Finally, as shown in FIG. 8, the probe 104 has reached the float switch 106 which, through an appropriate electrical circuit, not shown, but of standard type, actuates solenoid valve to close the vent to atmosphere, to permit air from the compressor or pump 20 to be introduced at a steady rate, under predetermined pressure, to the sparger 22.

A predetermined amount of influent sewage liquid within the circulator 18 is segregated from the main body of liquid within the compartment 32 for example, whereby all of the air introduced under pressure through the sparger 22 to the segregated body of liquid is dispersed throughout said body in a manner that quickly supersaturates it with said liquid. Such saturation continues until the overall pressure within the circulator 18 equals the pressure for which the relief valve 78 is set to open, whereupon continued introduction of air under pressure into the circulator 18 functions somewhat as a pump to dispel or discharge the super-saturated liquid through the discharge valve 78, as exemplified diagrammatically in FIG. 9. The check valve 66 is closed under the circumstances and discharge of the super-saturated liquid takes place from the conduit 80 into the sub-compartment 34, for example, of first compartment 14 shown in FIG. 1. Meanwhile, the probe 104 within the guide tube 110 continues to fall in response to the lowering liquid within the circulator 18 until a predetermined lower level is reached as exemplified in FIG. 10.

When the liquid within the guide tube 110 discharges into the container 46 of circulator 18, the probe 104 finally is lowered to a position where it actuates the float switch 106, for example, sequentially to actuate the solenoid valves 56 and 100 respectively to direct air away from circulator 18 and open the vent to atmosphere. The pressure within the circulator 18 by this time has decreased to such extent that it at least approaches atmospheric pressure, whereupon the discharge valve 78 has closed automatically and gravity, acting upon the main body of liquid within compartment 32, causes the same to flow through the check valve 66 of circulator 18 and again fill the circulator 18 to the level of the surrounding liquid and the cycle repeats itself.

If desired, the arrangement thus far described, such as shown in detail in FIG. 3, may be used as an operative unit. For more efficient treatment however, the more extensive system, which includes successive treatment tanks or compartments, as shown in FIG. 1, may be used, as follows.

It is apparent from the foregoing description and especially the arrangement of the 2-way valve 56, for example, which leads from the compressor or pump 20, that said valve can be caused to cycle in such a way as sequentially to operate the circulators 18 respectively in the compartments 14 and 16. However, if desired, the circulators may be operated independently of each other, simultaneously if desired, or in accordance with any desired sequence which operating conditions demand, all of which may be controlled by a suitable adjustment of the input air by varying the operation of pump 20.

Referring to FIG. 1, it will be seen that exemplary liquid level 112 is shown as being substantially the same in all primary and sub-compartments. In accordance with the operation described hereinabove, it will be seen that when a segregated batch of liquid, which has been super-saturated, is discharged from the circulator 18 in compartment 32, it is directed into sub-compartment 34. This raises the level of the liquid in said sub-compartment, whereby some of the liquid flows back into primary compartment 32 from sub-compartment 34, in accordance with the direction arrow 114. However, because of the downward discharge of the super-saturated liquid from conduit 80 into sub-compartment 34, it is to be presumed that the oxygen-enriched liquid will very largely remain in sub-compartment 34 for the propagation of bacteria therein and ultimate deposit of the bacteria upon the layer of sludge which gradually accumulates upon the screen 44 within sub-compartment 34.

Said layer of sludge retards the discharge of B.O.D. through the screen 44 but, ultimately, the liquid gradually flows through said layer of sludge upon the screen and passes in the direction of the arrow 116, through the opening 118, beneath baffle 12, into the primary compartment 38 of second compartment 16, wherein the partially oxygen-enriched liquid will be further enriched due to the cycling operation of the pneumatic circulator 18 within the compartment 38. Upon being further enriched, it is discharged into the sub-compartment 40 of second compartment 16 where it ultimately enriches the bacteria content of the liquid therein which, in turn, is nourished by the sludge upon the screen 44 within sub-compartment 40. Accordingly, by the time the liquid ultimately passes through the layer of sludge on said screen 44, the B.O.D. content of the liquid has been very substantially reduced so that it may pass in the direction of the arrow 120, through the opening 122 beneath baffle 124, and thereby rise within passage 126 so that it may exit from the system through discharge means 26.

During operation, the liquid level in the tank 10 remains substantially constant. After the initial filling of the tank, operation of the compressor or pump 20 is initiated and it will be operated continuously under normal conditions. Because of the relatively low capacity, however, in proportion to the volume of effluent to be treated, the cost of operation is correspondingly low, particularly considering that it is the only item in the system requiring power with the exception of the minor amount of current required to operate the solenoid-actuated valves 56 and 100. No additional pumps are required to empty or fill the pneumatic circulators 18 for example; they are filled by gravity flow and they are emptied solely by air pressure from compressor 20 when the internal pressure of the pneumatic circulators equal and exceeds the pressure setting of discharge or relief valve 78.

Such discharge continues until the probe 104 descends to its lower limit to actuate float switch 106, whereupon the solenoids function to close compressor delivery valve 56 and open valve 100 to vent the containers 46 of the circulator units 18 to atmosphere. Following this, inlet check valve 66 opens and effluent enters container 46 by gravity and raises the probe 104 to the upper level for which it is set, whereupon the vent valve 100 is closed and compressor valve 98 is opened, and the foregoing cycle of operations repeats itself.

This very simple system will function continuously or, if desired, especially for relatively small volume use, the compressor 20 can be controlled by a timer to function cyclically on a suitable schedule. Passage of partially treated effluent successively between the various primary and secondary or sub-compartments occurs automatically incident to the discharge of super-saturated effluent from the pneumatic circulators in the primary compartments.

Hence, the input to the system controls the output, as well as the digestion period. However, due to the acceleration of the bacterial growth induced by the super-saturation of the effluent, the digestion period is substantially shorter than in conventional aerobic systems for treating organic waste. Further, the capacity of the treating tank may be materially less than in such aforementioned conventional systems, notwithstanding the shorter digestion period to reduce the B.O.D. of the organic waste to an acceptable level for discharge into public waterways.

The invention, therefore, comprises a mechanical system in which the most essential single feature is the pneumatic circulator which provides a maximum desired quantity of dissolved oxygen in the effluent in a very economical and, therefore, practical manner, without requiring complex and expensive equipment. The only moving parts are the compressor and solenoid valves and especially the compressor and solenoid valves may be mounted above ground level, remote from the treatment tank, both for easy access and to save it from atmospheric conditions. Further, the "pumping" function of the pneumatic circulators 18, while highly suited for use in the system described above, is not to be restricted to such use since it is capable of many uses in other systems and for other purposes.

I claim:

1. A sewage treatment system comprising in combination, a tank having inlet means at one end for influent liquid to be treated and outlet means at the other end for treated liquid, means to segregate limited quantities of said influent within said tank, means operable to inject air under pressure to effect supersaturation of said quantities of liquid with air to increase the oxygen content thereof to accelerate the development of bacteria, and means to discharge said super-saturated liquid into the influent in said tank cyclically to induce rapid propagation of bacteria therein for conversion of waste material into stable compounds suitable for discharge into public water sources or the atmosphere.

2. The sewage treatment system according to claim 1 further including inlet and discharge means for said segregating means, and cyclical means to control the inlet and discharge of influent to and from said segregating means.

3. The sewage treatment system according to claim 2 in which said inlet and discharge means comprises a check valve controlling the inlet of said quantities of influent to said segregating means and a pressure responsive valve controlling the discharge of super-saturated liquid therefrom.

4. The sewage treatment system according to claim 2 in which said means to inject air into said segregated quantities of said liquid comprises an air compressor and conduit means connected between said compressor and segregating means.

5. The sewage treatment system according to claim 4 in which said air compressor is remote from said segregating means and said segregating means also includes a perforated sparger within said segregating means.

6. The sewage treatment system according to claim 2 in which said segregating means comprises a closed compartment and further including means to discontinue the injection of air into said compartment after discharge of super-saturated liquid therefrom, whereby said compartment may receive a new charge of influent liquid by gravity.

7. The sewage treatment system according to claim 1 in which said tank includes dividing means to separate the same into a plurality of compartments and each compartment includes a pneumatic circulator unit comprising and enclosure to contain said segregated quantities of said influent, an air injecting sparger in each compartment comprising said means to inject air into said segregated quantities, an air compressor, and means connecting said compressor to each sparger in said pneumatic circulator units.

8. The sewage treatment system according to claim 7 further including control means operable to cycle the delivery of air from said compressor successively to said spargers of said units in said compartment, whereby when the pneumatic circulator unit in one compartment is discharging super-saturated liquid into said compartment, the sparger of the pneumatic circulator unit in the other compartment is shut off.

9. The sewage treatment system according to claim 1 further including means in said tank to divide the same into a primary compartment and sub-compartment, and a substantially horizontal screen supported within said sub-compartment to receive and retain a layer of sludge thereon developed with the partially saturated influent from said primary compartment, whereby said partially super-saturated influent passes through said screen and layer of sludge at a retarded rate.

10. The sewage treatment system according to claim 9 further including separating means in said tank to form a second compartment, and discharge means from said first compartment communicating with said second compartment to permit passage of partially treated liquid from the screen in said first compartment to said second compartment, and means in said second compartment operable to segregate quantities of said partially treated liquid and inject additional air under pressure into said segregated partially treated liquid to further super-saturate the same with air to further promote the growth of bacteria therein.

11. The sewage treatment system according to claim 10 further including means to form a sub-compartment in said second compartment, and a screen supported substantially horizontally in said sub-compartment of said second compartment operable to receive and retain sludge thereon.

12. The sewage treatment system according to claim 11 further including baffles within said tank positioned and operable to retard the flow of partially treated liquid between said first and second compartments and also between said primary compartments and sub-compartments within said first and second compartments.

13. The sewage treatment system according to claim 9 in which said means to segregate a quantity of influent within said tank comprises an enclosure and said means to inject air into said segregated quantity comprises a sparger within said enclosure, said system further including a baffle separating said tank into two compartments, said enclosure for a segregated quantity of said liquid being positioned within one compartment and having discharge means extending over said baffle into said second compartment, and a sludge retaining screen supported in said second compartment below said discharge means from said first compartment to receive and retain sludge developed in said first compartment and thereby retard the passage of B.O.D. into the second compartment through said screen.

14. The sewage treatment system according to claim 13 in which said enclosure in said first compartment has inlet means for raw influent positioned in the lower portion of said compartment.

15. The sewage treatment system according to claim 1 in which said means to segregate quantities of said influent within said tank comprises an enclosure and said means to inject air into said segregated quantities of influent within said enclosure comprises a perforated sparger within said enclosure, said system also including a compressor connected to said sparger, an inlet control valve on said sparger operable to control the volume of air delivered under pressure thereto, and a floating probe movable vertically within said enclosure and interconnected to switch means operable to actuate said air inlet control valve for operation thereof to effect discharge of aerated liquid from said enclosure by air pressure and discontinue the inlet of air at the completion of discharge from said enclosure to permit a succeeding quantity of segregated liquid to flow into said enclosure.

16. The sewage treatment system according to claim 1 further including auxiliary air discharge means within said tank connectable to a source of air under pressure and operable to partially aerate influent within said tank prior to quantities thereof being segregated for super saturation thereof with air.

References Cited

UNITED STATES PATENTS

| | | | |
|---|---|---|---|
| 2,144,386 | 1/1939 | Nordell | 210—139 |
| 2,830,947 | 4/1958 | Griffith | 210—220 X |
| 3,260,368 | 7/1966 | Wagner et al. | 210—220 X |
| 3,342,727 | 9/1967 | Bringle | 210—139 X |

JAMES L. DeCESARE, Primary Examiner

U.S. Cl. X.R.

210—205, 220